United States Patent

Vora

[11] 3,879,487
[45] Apr. 22, 1975

[54] HYDROGEN FLUORIDE ALKYLATION UTILIZING A HEAT EXCHANGER IN THE SETTLING ZONE

[75] Inventor: Bipin V. Vora, Buffalo Grove, Ill.

[73] Assignee: Universal Oil Products Company, Des Plaines, Ill.

[22] Filed: Apr. 15, 1974

[21] Appl. No.: 461,080

[52] U.S. Cl..... 260/683.48; 260/668 B; 260/683.42
[51] Int. Cl............................................. C07c 3/54
[58] Field of Search....... 260/683.48, 668 B, 683.42

[56] References Cited
UNITED STATES PATENTS

| | | | |
|---|---|---|---|
| 2,392,962 | 1/1946 | Abrams et al. | 260/683.48 |
| 3,171,865 | 3/1965 | Davison et al. | 260/683.48 |
| 3,213,157 | 10/1965 | Hays et al. | 260/683.48 |
| 3,431,079 | 3/1969 | Chapman | 260/683.48 |
| 3,478,125 | 11/1969 | Chapman | 260/683.48 |

Primary Examiner—Delbert E. Gantz
Assistant Examiner—G. J. Crasanakis
Attorney, Agent, or Firm—James R. Hoatson, Jr.; Robert W. Erickson; William H. Page, II

[57] ABSTRACT

Reduced energy consumption is an improved process for hydrogen fluoride catalyzed isoparaffin-olefin alkylations comprising reaction, settling and catalyst regeneration zones. Part of the energy necessary for heating a hydrocarbon phase effluent of the settling zone is provided by energy released in the condensation of catalyst regeneration zone overhead vapors. The external energy requirement for heating the hydrocarbon phase is reduced, and the external energy required to operate a condenser for the overhead vapors is eliminated.

10 Claims, 1 Drawing Figure

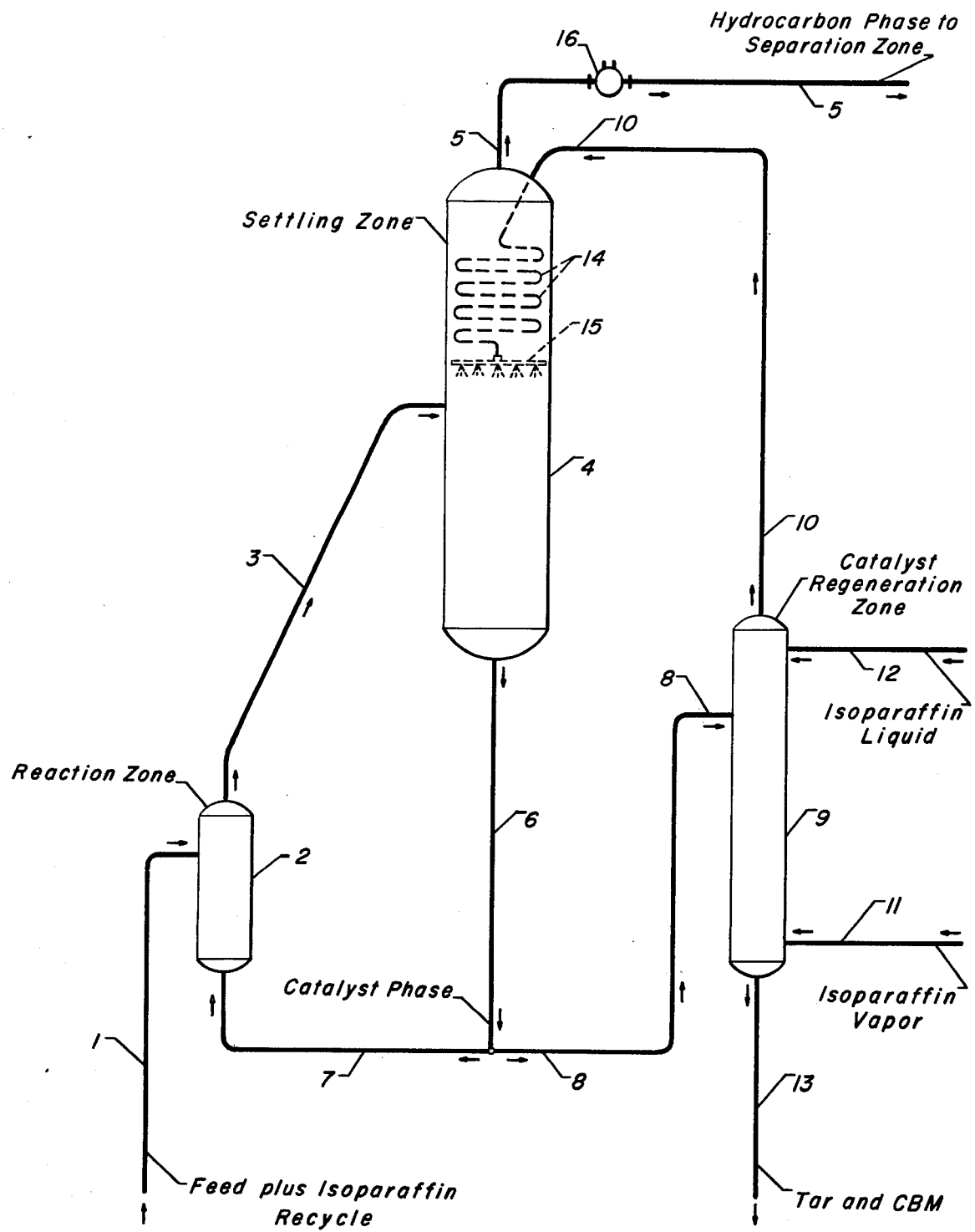

HYDROGEN FLUORIDE ALKYLATION UTILIZING A HEAT EXCHANGER IN THE SETTLING ZONE

BACKGROUND OF THE INVENTION

1. Field of the Invention

The field of art to which this invention pertains is hydrocarbon processing. It particularly relates to an improved process for the production of an isoparaffin-olefin alkylation product through hydrogen fluoride catalysis.

2. Prior Art

The production of higher molecular weight isoparaffins, having valuable antiknock properties as motor fuel, is of considerable importance in the petroleum refining industry. A convenient source of such higher molecular weight isoparaffins is the catalytic alkylation of lower boiling isoparaffinic hydrocarbons, such as isobutane, with olefinic hydrocarbons, such as propene and butenes. It is well known in the art that catalytic alkylation using acid catalysts, such as hydrofluoric acid, has become an important tool for preparing alkylated hydrocarbons. However, there is an inherent energy-wasting feature of conventional designs of hydrogen fluoride-catalyzed alkylation process units. In the past the amount of energy consumed by a process unit has been relegated a position of lesser importance than such characteristics as reliability and product quality. However, in present days of energy shortage the efficiency of a process with respect to energy consumption has become a major factor of concern both to designers and operators of processing plants.

In conventional designs the hydrogen fluoride catalyst is regenerated on a continuous or semi-continuous basis. Regeneration is accomplished by fractionating the acid in a regeneration zone. Resultant catalyst vapors from the regeneration zone are condensed by withdrawing heat in a condenser. The heat withdrawn is generally released to the atmosphere and is lost from the process. My invention solves this prior art problem of energy waste by utilizing, in a novel and convenient manner, the heat energy withdrawn from regenerated catalyst vapors to provide heat where required in another part of the process.

BRIEF SUMMARY OF THE INVENTION

My invention involves an improved hydrogen fluoride alkylation process with reduced energy consumption. Catalyst regeneration zone overhead vapors are condensed by exchanging heat with the hydrocarbon phase effluent of a settling zone. Catalyst regeneration zone overhead vapors leaving the regeneration zone pass to heat exchange means situated within the settling zone where condensation takes place. Condensed vapors then discharge from the heat exchange means into the settling zone. The point of discharge is above the entrance of reaction zone effluent into the settling zone. By recovering the heat from catalyst regeneration zone overhead vapors, instead of releasing it to the environment, the requirement of the process for external energy is reduced.

OBJECTS AND EMBODIMENTS

It is an object of this invention to provide an improved process for the hydrogen fluoride catalyzed alkylation of an isoparaffin with an olefin. A still further object of may invention is to provide a method for producing higher molecular weight isoparaffins in a more facile and economical manner.

In one embodiment my invention affords, in an alkylation process wherein: (a) a feed comprising an olefin-acting hydrocarbon and an alkylatable hydrocarbon is contacted with hydrogen fluoride alkylation catalyst at alkylation reaction conditions in a reaction zone; (b) a reaction zone effluent is separated in a settling zone into a hydrocarbon phase and a catalyst phase; (c) a first portion of said catalyst phase is withdrawn from said settling zone and is returned to said reaction zone; (d) a second portion of said catalyst phase is passed to a catalyst regeneration zone; (e) an admixture comprising catalyst vapors and alkylatable hydrocarbon vapors is withdrawn from said catalyst regeneration zone and is passed to a condenser; (f) said admixture of vapors is condensed in said condenser and returned to said reaction zone; the improvement which comprises passing said admixture of vapors to the inlet of heat exchange means placed within said settling zone, which heat exchange means communicate with said settling zone through an outlet; passing said admixture of vapors through said heat exchange means; withdrawing heat from and thereby condensing said admixture of vapors within said heat exchange means; passing said condensed vapors through said outlet and into said settling zone; and absorbing into said hydrocarbon phase at least a part of said heat withdrawn from said admixture of vapors.

BRIEF DESCRIPTION OF THE DRAWING

The attached drawing illustrates a particular embodiment of the present invention. Only such details are included as are necessary for a clear understanding of may invention, and no intention is thereby made to unduly limit its scope. Certain items necessary to the operation of the process of this invention but unnecessary to its understanding, such as certain process streams, valves, pumps, instrumentation and other equipment, have been omitted for the sake of clarity.

Referring now to the drawing, an alkylation feed stream, premixed with recycle isoparaffins, enters the process of this invention in conduit 1 and passes to reaction zone 2 where contact is effected with hydrogen fluoride alkylation catalyst. Reaction zone effluent, including a catalyst phase, alkylated hydrocarbons and unreacted hydrocarbons, exits the reaction zone in conduit 3 and passes to settling zone 4, where the reaction zone effluent is settled and separated into a catalyst phase and a hydrocarbon phase. The catalyst phase, which is inherently higher in density than the hydrocarbon phase, leaves settling zone 4 in conduit 6 and is divided into a portion which passes to catalyst regeneration zone 9 in conduit 8 and the remaining portion which exits conduit 6 in conduit 7 and passes to reaction zone 2. The lower density hydrocarbon phase within settling zone 4 rises from the inlet point of conduit 3, contacts regenerated catalyst exiting outlet 15, absorbs heat from heat exchange means 14 and exits settling zone 4 in conduit 5. The hydrogen phase absorbs in heater 16 any additional heat which may be required before proceeding in conduit 5 to a downstream separation zone where alkylated hydrocarbons are recovered.

Water and heavy organic material are dissolved in the catalyst upon its contact with feed and recycle isoparaffin in reaction zone 2. These materials are considered to be catalyst contaminants. For this reason a portion of the catalyst phase from settling zone 4 passes to a middle section of catalyst regeneration zone 9 in conduit 8. Superheated isoparaffin vapor enters a lower section of regeneration zone 9 in conduit 11, passing upwardly within the regeneration zone and counter-currently contacting the catalyst phase. Liquid isoparaffin is introduced as reflux into an upper section of catalyst regeneration zone 9 in conduit 12. Vapors comprising hydrogen fluoride and isoparaffin exit the regeneration zone in conduit 10 and pass to heat exchange means 14 where heat is removed from the vapors. The hydrocarbon phase within settling zone 4 absorbs heat sufficient to condense and subcool the regeneration zone vapors. Condensed regeneration zone vapors exit heat exchange means 14 in outlet 15 and pass into and contact the rising hydrocarbon phase. The catalyst portion of the condensed regeneration zone vapors is withdrawn from settling zone 4 in conduit 6, and the isoparaffin portion exits with the hydrocarbon phase in conduit 5. Heavy organic material, commonly referred to as tar, and an azeotropic mixture of hydrogen fluoride and water, known as CBM (constant boiling mixture), exit regeneration zone 9 in conduit 13.

DETAILED DESCRIPTION OF THE INVENTION

In the alkylation process of my invention reactants ideally combine to yield, as a principal product, a hydrocarbon of carbon content equal to the sum of the carbon atoms of the olefin and alkylatable reactants. A suitable alkylatable reactant may be a paraffinic hydrocarbon having a tertiary carbon atom such as isobutane, or higher homologs of isobutane such as 2-methylbutane, 2-methylpentane, etc. Other useful alkylatable reactants include benzene, toluene, xylene, naphthenes, phenols cresols, amines and the like.

The olefin reactants which may suitably be used in my invention include $C_3$ - $C_{20}$ olefinic hydrocarbons, alkyl halides, alcohols, alkyl sulfates, alkyl phosphates, etc. Mono-olefins are preferable, such as propene and butenes.

Alkylation of the paraffinic reactant with the olefin is effected in the presence of an acid catalyst. Suitable catalysts include hydrogen halides, mineral acids such as phosphoric acid, Friedel-Crafts metal halides such as aluminum chloride, boron fluoride, etc. A preferred hydrogen fluoride catalyst contains from 70 percent - 90 percent hydrogen fluoride, less than 2 percent water and organic material as the balance of 100 percent.

Alkylation reaction conditions to be maintained within the reaction zone of the present invention include a temperature of from about 0°F to about 150°F and a pressure of from about 1 atmosphere to about 40 atmospheres. The reaction temperature is one of the most important variables as it has a significant influence on the quality of the alkylate product. A preferred range of temperature is from about 80°F to about 100°F. Pressure is not a significant variable with respect to product quality, provided that it is sufficient to keep all hydrocarbon and acid catalyst in the liquid state. The volumetric ratio of acid catalyst to hydrocarbon within the reaction zone is maintained within the range of 0.5:1 to 2:1. At some point below 0.5:1 process efficiency decreases for many reasons, among which are occurrence of undesirable reactions and non-completion of desirable reactions. There appears to be no alkylate yield or quality improvement in increasing this ratio above 2:1. It is desirable to maintain a high ratio of the molar concentration of isoparaffin or aromatic present to the molar concentration of olefin present within the reaction zone in order to produce high quality mono-alkylate. A broad range of this ratio is from about 6:1 to about 20:1 with a preferred operating range being from about 8:1 to about 16:1.

The settling zone of the process of my invention should be maintained at substantially the same pressure as the reaction zone to ensure that the catalyst and hydrocarbon components contained therein remain in the liquid phase. In a preferred embodiment of my invention the settling zone is a vertically oriented vessel. Reaction zone effluent should enter a middle section of the vessel. In an upper section of the vessel heat exchange means are installed which may be a coil or tube bundle. The coil or tube bundle has its inlet at the top of the separation vessel, and its outlet is within the upper section of the vessel. The outlet may be a distribution device typical of those well known in the art which distribute liquid streams within vessels. It may comprise one or more horizontally positioned tubes having closed ends and a plurality of openings which emit liquid streams directed substantially uniformly about the cross-section of the settling zone. The outlet must be situated above the inlet of the reaction zone effluent stream so that contact is effected between regenerated catalyst, which exits the outlet, and the hydrocarbon phase of reaction zone effluent. This contact has the beneficial effect or reducing the alkyl fluoride content of the alkylate product, thereby improving its quality. It should be noted that the heat exchange means communicate with the settling zone only through the outlet.

The catalyst regeneration zone of may invention comprises a fractionating tower having 5 or more contact stages and operates at a pressure from about 100 to about 250 psig. Catalyst fed to the regeneration zone should enter the tower at a middle section. Superheated isoparaffin vapor is introduced into a lower section of the tower. Catalyst, after passing through the reaction zone of an alkylation process, commonly contains water and heavy organic material. The superheated isoparaffin vapor passes upwardly within the fractionating tower, countercurrently contacting the catalyst and stripping hydrogen fluoride vapors from the water and heavy organic material. Further purification of the hydrogen fluoride occurs when rectification is effected between the vapor rising within the fractionating tower and isoparaffin liquid which is introduced into the top of the tower. Rectification, as is well known in the art, is a distillation in which a vapor is continuously and counter-currently contacted with a condensed portion of the vapor, and results in a much greater enrichment of the vapor in the more volatile components than would be possible with single distillation operation using the same amount of heat energy.

Vapors leaving the top of the catalyst regeneration zone pass to the heat exhange means situated within the settling zone of my invention. The vapors pass through the heat exchange means and are condensed and subcooled therein. The vapors entering the heat exchange means are typically at 175°F when the catalyst regeneration zone is operated at 150 psig. The reaction zone effluent entering the settling zone is typically at 90°F. When the process of my invention is operated at an isoparaffin to olefin ratio of 12:1 in the reaction zone, the hydrocarbon phase exiting the settling zone is commonly about 20 times by weight greater than the vapors entering the heat exchange means. The vapors will be cooled essentially to 90°F in passing through the heat exchange means, and the hydrocarbon phase in passing over the heat exchange means will be raised from 90°F to approximately 95°F. Catalyst contaminants exit the bottom of the catalyst regeneration zone in the form of tar and CBM. After passing through the regeneration zone, the heavy organic material which contaminated the catalyst is tar-like in appearance. The water which contaminated the catalyst exits in an azeotropic mixture of water and hydrogen fluoride which is referred to as CBM (constant boiling mixture). CBM commonly contains about 50 wt. percent hydrogen fluoride.

The process of my invention is most useful by virtue of its reduced energy requirement. Referring again to the attached drawing which shows a preferred embodiment of my invention, if should be noted that the heat which must be removed in order to condense and subcool the vapors exiting catalyst regeneration zone 9 in conduit 10 is recovered in the hydrocarbon phase leaving settling zone 4 in conduit 5. This heat raises the temperature of the hydrocarbon phase and in so doing lowers the heat input duty of heater 16. Heater 16 must raise the temperature of the hydrocarbon phase to a predetermined level of preheat before the hydrocarbon phase is introduced into a downstream separation zone, where an alkylate product is recovered. In common designs of alkylation processes a condenser is provided to condense catalyst regeneration zone overhead vapors, which condenser is generally an air or water cooled heat exchanger. Heat removed in this manner is lost either to the water or air effluent the condenser. The process of my invention avoids this loss of energy by recovering the heat removed from the condensing vapors and using this heat to lower the external energy requirement of the heater used to preheat the hydrocarbon effluent from the settling zone. That external energy which would be required to operate a condenser, e.g. to pump cooling water or to blow cooling air, is also eliminated.

Reasonable variation and modification are possible within the scope of the foregoing disclosure, the drawings, and the claims to the invention without departing from the spirit thereof.

I claim as my invention:

1. In an alkylation process wherein:
   a. a feed comprising an olefin-acting hydrocarbon and an alkylatable hydrocarbon is contacted with hydrogen fluoride alkylation catalyst at alkylation reaction conditions in a reaction zone;
   b. a reaction zone effluent is separated in a settling zone into a hydrocarbon phase and a catalyst phase;
   c. a first portion of said catalyst phase is withdrawn from said settling zone and is returned to said reaction zone;
   d. a second portion of said catalyst phase is passed to a catalyst regeneration zone;
   e. an admixture comprising catalyst vapors and alkylatable hydrocarbon vapors is withdrawn from said catalyst regeneration zone and is passed to a condenser;
   f. said admixture of vapors is condensed in said condenser and discharged into said settling zone; the improvement which comprises passing said admixture of vapors to the inlet of heat exchange means situated within said settling zone, said heat exchange means commicating with said settling zone through an outlet; passing said admixture of vapors through said heat exchange means; withdrawing heat from said admixture of vapors and thereby condensing said admixture of vapors within said heat exchange means; passing said condensed vapors through said outlet and into said settling zone; said hydrocarbon phase in said settling zone absorbing said heat withdrawn from said admixture of vapors 2. The improvement of claim 1 further characterized in that said olefin acting hydrocarbon is an olefin having 3 to 4 carbon atoms per molecule.

3. The improvement of claim 1 further characterized in that said alkylatable hydrocarbon is isobutane.

4. A process for producing high-octane alkylated hydrocarbons which comprises the steps of:
   a. introducing an isoparaffin-olefin feed into a reaction zone;
   b. contacting said feed with hydrogen fluoride alkylation catalyst in said reaction zone at alkylation reaction conditions;
   c. passing a reaction zone effluent comprising hydrogen fluoride, alkylated hydrocarbons and unreacted hydrocarbons into a middle section of a vertical settling zone to settle said effluent into a hydrocarbon phase in said middle section and a catalyst phase in a lower section of said zone, said catalyst phase being contaminated with water and organic material as a result of said step, heat exchange means being situated within said settling zone above said middle section and communicating with said settling zone through an outlet;
   d. withdrawing a hydrocarbon phase from an upper portion of said settling zone, and withdrawing a contaminated hydrogen fluoride catalyst phase from a lower portion of said settling zone;
   e. returning a first portion of said contaminated hydrogen fluoride catalyst phase from steps (d) to said reaction zone, and passing said hydrocarbon phase from step (d) to a hydrocarbon separation zone;
   f. passing a second portion of said contaminated hydrogen fluoride catalyst phase from step (d) to a middle section of a vertical catalyst regeneration zone operated at conditions selected to provide a liquid comprising an admixture of tar, hydrogen fluoride and water and a vapor comprising an admixture of hydrogen fluoride and isoparaffin;
   g. passing said vapor through said heat exchange means; to withdraw heat from said vapor into said hydrocarbon phase thereby condensing said vapor, and;
   h. passing said condensed vapor through said outlet into said settling zone to reduce the alkyl fluoride content in said hydrocarbon phase.

5. The process of claim 4 further characterized in that said outlet of said heat exchange means within the settling zone is situated above the middle section of said settling zone.

6. The process of claim 4 is further characterized in that an isoparaffin vapor is introduced into a lower section of said regeneration zone and an isoparaffin liquid is introduced into an upper section of said regeneration zone.

7. The process of claim 4 further characterized in that said isoparaffin-olefin feed comprises isobutane and an olefin having 3 to 4 carbon atoms per molecule.

8. The process of claim 4 further characterized in that said hydrogen fluoride alkylation catalyst is maintained between about 80 and 90 wt. percent hydrogen fluoride.

9. The process of claim 2 further characterized in that said isoparaffin vapor comprises superheated isobutane vapor.

10. The process of claim 2 further characterized in that said isoparaffin liquid comprises liquid isobutane.

* * * * *